United States Patent
Kim et al.

(10) Patent No.: US 11,106,395 B2
(45) Date of Patent: Aug. 31, 2021

(54) APPLICATION EXECUTION APPARATUS AND APPLICATION EXECUTION METHOD

(71) Applicant: Hitachi, Ltd., Tokyo (JP)

(72) Inventors: Sungho Kim, Tokyo (JP); Yusaku Otsuka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/809,880

(22) Filed: Mar. 5, 2020

(65) Prior Publication Data

US 2020/0310693 A1   Oct. 1, 2020

(30) Foreign Application Priority Data

Mar. 28, 2019 (JP) ............................. JP2019-064876

(51) Int. Cl.
    *G06F 3/06* (2006.01)
(52) U.S. Cl.
    CPC .......... *G06F 3/0659* (2013.01); *G06F 3/0604* (2013.01); *G06F 3/0673* (2013.01)
(58) Field of Classification Search
    None
    See application file for complete search history.

(56) References Cited

U.S. PATENT DOCUMENTS

| 2013/0145372 A1 | 6/2013 | Liu et al. |
| 2016/0283284 A1 | 9/2016 | Sun et al. |

FOREIGN PATENT DOCUMENTS

JP    2018-513463 A    5/2018

OTHER PUBLICATIONS

European Extended Search Report dated Jul. 27, 2020, issued in EP counterpart application No. 20161807.1.

*Primary Examiner* — Idriss N Alrobaye
*Assistant Examiner* — Dayton Lewis-Taylor
(74) *Attorney, Agent, or Firm* — Mattingly & Malur, PC

(57) ABSTRACT

To provide an application execution apparatus that can achieve a real-time property of an application. An application execution apparatus (100, 1400) that executes an application including a data acquisition unit (170) that acquires data transmitted from an IO device and a data utilization unit (131) that utilizes the data acquired by the data acquisition unit (170), includes: a first calculation device that implements the data acquisition unit (170) in a first space in which the application is able to be started after an occurrence of an event for starting the application within a time required for the application; a data linkage unit (132) that links the data acquired by the data acquisition unit (170) to the data utilization unit (131); and a second calculation device that implements the data utilization unit (131) in a second space different from the first space.

9 Claims, 14 Drawing Sheets

| IO IDENTIFIER | INTERRUPT IDENTIFIER | ADDRESS RANGE |
|---|---|---|
| NW DEVICE | IRQ1 | 0xA000-0xB000 |
| FPGA | IRQ2 | 0xC000-0xD000 |
| OS LINKAGE UNIT | IRQ3 | 0xE000-0xF000 |
| IOn | IRQn | 0xnnnn-0xNNNN |

APPLICATION EXECUTION APPARATUS AND APPLICATION EXECUTION METHOD

CROSS-REFERENCE TO RELATED APPLICATION

The present application claims priority from Japanese application JP2019-064876, filed on Mar. 28, 2019, the contents of which is hereby incorporated by reference into this application.

TECHNICAL FIELD

The present invention relates to an application execution apparatus and an application execution method, and for example is suitably applied to an application execution apparatus and an application execution method for executing an application including a data acquisition unit that acquires data transmitted from an IO device and a data utilization unit that utilizes the data acquired by the data acquisition unit.

BACKGROUND ART

Conventionally, a real-time property of an application (real-time application) on a controller in a real-time system has been guaranteed by using a Real Time Operating System (RTOS) dedicated for guaranteeing the real-time property. The application is mainly in charge of processing of inputting data to the application (data acquisition) as well as calculation processing on the data and processing of outputting a result of the calculation (data utilization).

Unfortunately, the RTOS only has a function dedicated to guaranteeing the real-time property, and thus is incapable of implementing (operating) technologies such as Artificial Intelligence (AI) for implementing connectivity to other devices and data processing required in recent Internet of Things (IoT). Thus, controllers using a general-purpose Operating System (OS) such as Linux (registered trademark) have been popularly used.

However, the real-time property of real-time applications is difficult to guarantee with general-purpose OSs. This is because the general-purposes OSs executes various types of processing with not only a real-time application but also an application for connection to other devices, an application for data processing, threads in a kernel, and the like running thereon.

To guarantee the real-time property, a deadline and punctuality need to be guaranteed, respectively meaning that processing by the application ends within a predetermined deadline and that a time difference between a timing at which an event triggering the start of the processing by the application occurs and a timing at which the application starts the processing can be predicted.

In order to guarantee the deadline, real-time systems generally have the application designed with application processing time set to be equal to or shorter than a predetermined value (20% for example) relative to the deadline or set in the other like way to be sufficiently within the deadline. This enables a controller using a general-purpose OS to meet the deadline.

However, guaranteeing punctuality with a general-purpose OS is extremely difficult due to interference with processing by other applications and interference with processing in a kernel. In view of this, a technique has been known in which certain processing is offloaded to a child processor instead of being executed by the main central processing unit (CPU), so as not to interfere with the other processing (see Patent Literature 1).

CITATION LIST

Patent Literature

Patent Literature 1: Japanese Translation of PCT International Application Publication No. JP-T-2018-513463

SUMMARY OF INVENTION

Technical Problem

However, with the technique described in Patent Literature 1, the amount of processing to be offloaded depends on hardware. Thus, the technique is difficult to apply to a real-time application involving various types of IO processing.

In order to guarantee a real-time property of a real-time application involving various types of IO processing on a general-purpose OS, implementation of a method of executing a real-time application that does not depend on hardware requirements has been called for. In particular, punctuality must be guaranteed for acquisition of input data to the real-time application without fail.

The present invention has been made in view of the above points, and an object of the present invention is to propose an application execution apparatus that can achieve the real-time property of an application.

Solution to Problem

To solve the problem described above, in the present invention, an application execution apparatus executes an application including a data acquisition unit that acquires data transmitted from an IO device and a data utilization unit that utilizes the data acquired by the data acquisition unit, characterized by including: a first calculation device that implements the data acquisition unit in a first space in which the application is able to be started after an occurrence of an event for starting the application within a time required for the application; a data linkage unit that links the data acquired by the data acquisition unit to the data utilization unit; and a second calculation device that implements the data utilization unit in a second space different from the first space.

In the configuration described above, for example, the data acquisition unit is arranged in a calculation device that achieves the punctuality, so that a failure to acquire data due to interference with the other processing can be prevented. Thus, even in an apparatus including a general-purpose OS, the punctuality of the application can be achieved with the fluctuation of the performance on the general-purpose OS suppressed.

Advantageous Effects of Invention

The present invention can provide an application execution apparatus that can achieve the real-time property of an application.

DESCRIPTION OF EMBODIMENTS

Figure 1:
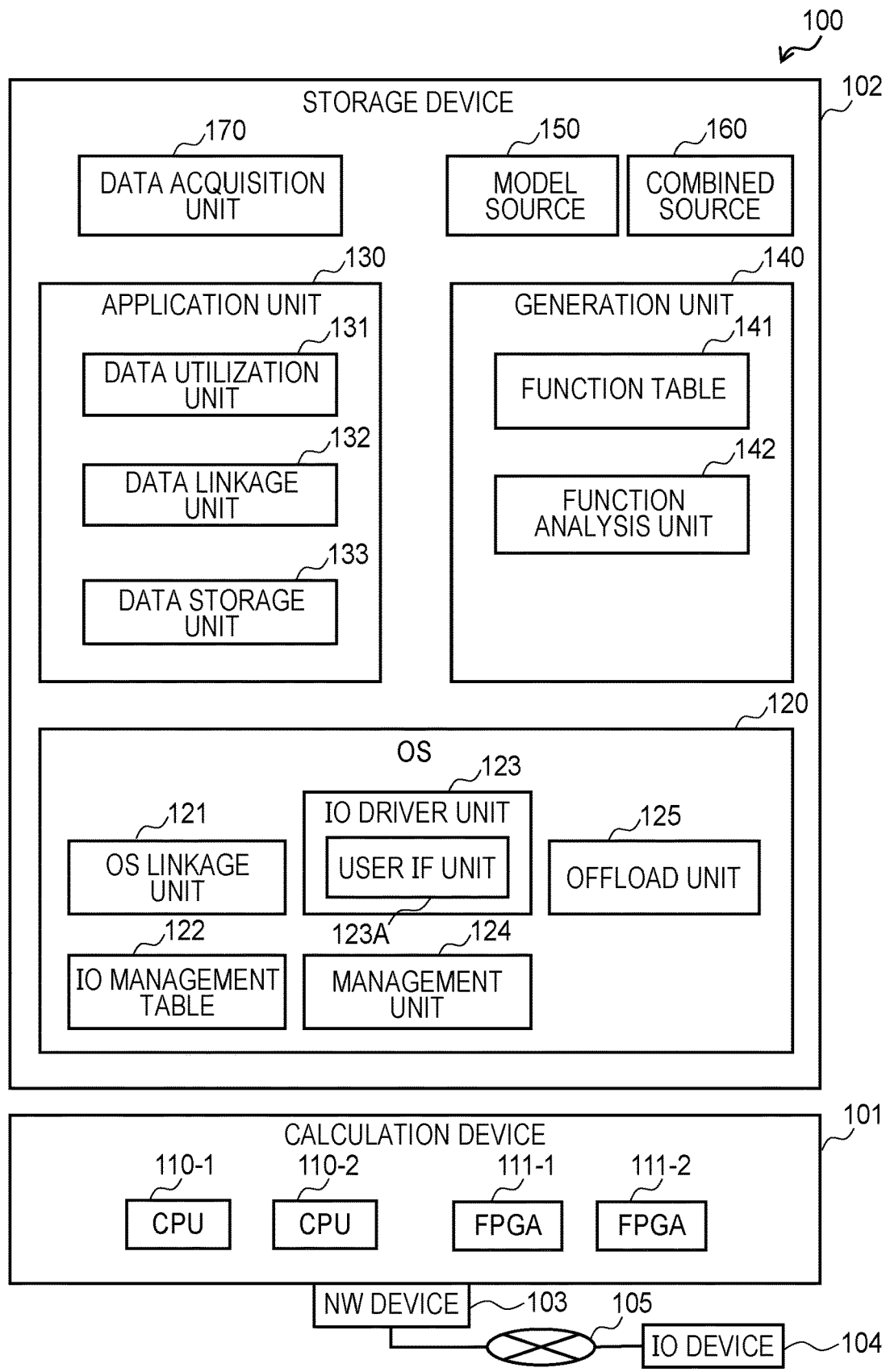
FIG. 1 is a diagram illustrating an example of a configuration related to an application execution apparatus according to a first embodiment.

Hereinafter, an embodiment of the present invention will be described in detail with reference to the drawings. The present embodiment relates to a technique for guaranteeing the real-time property of an application (for example, a real-time application). For example, in the present embodiment, an application is divided into a data acquisition unit and a data utilization unit, and the data acquisition unit required to be punctual is offloaded to a space (other hardware, kernel, or the like) involving a smaller interference with another processing, so as not to interfere with the other processing. The data acquisition unit offloaded passes the acquired data, input to the application, to the data utilization unit. Then, the data utilization unit executes calculation processing on the input data and processing of outputting a result of the calculation.

Note that in the following description, elements of the same type denoted with reference numerals having branch numbers may be described using a common part (part excluding the branch numbers) when they are described without being distinguished from each other. The elements of the same type may be described using the reference numerals with the branch numbers to be distinguished from each other. For example, central processing units (CPUs) may be referred to as a "CPU 110" when being described without being distinguished from each other, and may be referred to as a "CPU 110-1", a "CPU 110-2", and the like when being described while being distinguished from each other as individual CPUs.

(1) First Embodiment

In FIG. 1, reference numeral 100 denotes the entirety of an application execution apparatus according to a first embodiment.

FIG. 1 is a diagram illustrating an example of a configuration related to the application execution apparatus 100.

The application execution apparatus 100 includes a calculation device 101 and a storage device 102. The application execution apparatus 100 is connected to a network 105 via a network device (NW device) 103 and acquires data from an IO device 104. The network 105 is serial communication, parallel communication, Ethernet (registered trademark), or the like, and establishes a connection between one or more IO devices 104 and the calculation device 101. The IO device 104 is, for example, various sensors.

The calculation device 101 executes various programs. The calculation device 101 includes one or more CPUs 110 and one or more Field-Programmable Gate Arrays (FPGAs) 111. The calculation device 101 is connected to the IO device 104 through the network 105 via the NW device 103. The IO device 104 provides data used by the application. The calculation device 101 is not limited to the CPU 110 and the FPGA 111, and may include one or more other semiconductors such as a Graphics Processing Unit (GPU) and an Application Specific Integrated Circuit (ASIC).

The storage device 102 stores a program and data required for executing the program. The storage device 102 is, for example, a random access memory (RAM), a read only memory (ROM), a hard disk drive (HDD), or the like.

Next, the functional configuration of the application execution apparatus 100 will be described.

The application execution apparatus 100 includes an OS 120, an application unit 130, a generation unit 140, a model source 150, a combined source 160, and a data acquisition unit 170.

The OS 120 is a general-purpose OS such as Linux (registered trademark) or WINDOWS (registered trademark), and has functions of the general-purpose OS. The application unit 130 is executed by the OS 120 for each process managed by the OS 120. The generation unit 140 generates the combined source 160 from the model source 150, and compiles the combined source 160 thus generated to generate the data acquisition unit 170. The data acquisition unit 170 acquires data from the IO device 104 through the NW device 103. The data acquisition unit 170 is offloaded to (arranged in) the FPGA 111 and executed by the FPGA 111 for guaranteeing the punctuality of the data acquisition.

More specifically, the OS 120 includes an OS linkage unit 121, an IO management table 122, an IO driver unit 123, a management unit 124, and an offload unit 125. The application unit 130 includes a data utilization unit 131, a data linkage unit 132, and a data storage unit 133. The generation unit 140 includes a function table 141 and a function analysis unit 142.

(Preparation Stage: Data Linkage Between OS 120 and Application Unit 130)

The OS linkage unit 121 stores the data acquired by the data acquisition unit 170. The data linkage unit 132 of the application unit 130 connects the OS linkage unit 121 to the data storage unit 133 of the application unit 130. Thus, the data stored in the OS linkage unit 121 is reflected in the data storage unit 133 without copying.

More specifically, when the data linkage unit 132 calls a user IF unit 123A of the IO driver unit 123 in the OS 120, the IO driver unit 123 uses a memory map function (a function of the OS 120) to map the memory of the data storage unit 133 onto the address of a memory in the OS 120. With this processing, the data linkage unit 132 and the OS linkage unit 121 are connected to each other. In other words, the data storage unit 133 and the OS linkage unit 121 share the same memory. It should be noted that in the application execution apparatus 100, how the data storage unit 133 and the OS linkage unit 121 are connected to each other is not limited.

(Preparation Stage: Generation of Data Acquisition Unit 170)

Hereinafter, a method for generating the data acquisition unit 170 that can be implemented by the FPGA 111 will be described.

The model source 150 is created by an application developer. It should be noted that in the application execution apparatus 100, the language to be used for the creation is not limited. The model source 150 has three configurations. The application developer is in charge of creating data acquisition processing (description part 430) illustrated in FIG. 4. Note that interface processing (description part 420) with the IO device 104 for acquiring data from the IO device 104 and interface processing (description part 410) with the data utilization unit 131 are described in the model source 150. Details thereof will be described later.

In order to generate the data acquisition unit 170, the generation unit 140 uses the model source 150 as an input, and combines the input model source 150 with the function table 141 to generate a combined source 160.

The function analysis unit 142 analyzes the combined source 160 and updates the combined source 160. More specifically, the function analysis unit 142 read outs a function related to interface processing with the IO device 104 (a GET_IN function described later), and uses the IO management table 122 to replace it with processing of reading from the memory of the NW device 103 (see FIG. 11). Furthermore, the function analysis unit 142 reads a function related to interface processing with the data utilization unit 131 (a SET_OUT function described later), and uses the IO management table 122 to replace it with processing of writing to the memory of the OS linkage unit 121 (see FIG. 11).

The generation unit 140 compiles the updated combined source 160 into a file that can be executed by the FPGA 111 to generate the data acquisition unit 170. The generated data acquisition unit 170 is written to the FPGA 111 by the offload unit 125 in the OS 120.

(Operation Stage)

When the data acquisition unit 170 acquires the data, the data acquisition unit 170 stores the data in the OS linkage unit 121 and raises an interrupt to the calculation device 101. The interrupt is processed by the OS 120. As a result, the OS 120 activates the management unit 124 in the OS 120. The management unit 124 performs scheduling with the highest priority given to the execution of the data utilization unit 131 of the application unit 130.

The data utilization unit 131 calculates (analyzation and the like) the data, from the data acquisition unit 170, stored in the data storage unit 133, and outputs the calculation result. It should be noted that, in the application execution apparatus 100, the output destination of the calculation result is not limited.

Figures 2, 3:
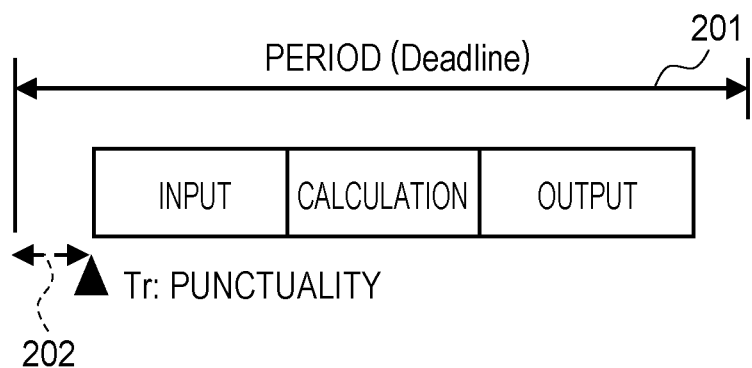
FIG. 2 is a diagram illustrating an application processing configuration and two parameters determining a real-time property according to the first embodiment.
FIG. 3 is a diagram illustrating an example of a configuration of an IO management table according to the first embodiment.

FIG. 2 is a diagram illustrating a configuration of processing (application processing) executed by an application and two parameters (deadline 201 and punctuality 202) determining the real-time property. For example, the application includes the data acquisition unit 170 and the data utilization unit 131.

The application processing mainly includes input processing for inputting data to the application, calculation processing for calculating the input data, and output processing for outputting a calculation result (calculation result).

To guarantee the real-time property, the deadline 201 and the punctuality 202 need to be guaranteed, respectively meaning that processing by the application ends within a predetermined deadline and that a time difference between a timing at which an event triggering the start of the processing by the application occurs and a timing at which the application starts the processing can be predicted.

In the present embodiment, the punctuality is guaranteed with the data acquisition unit 170 being in charge of (allocated with) application processing, and the data acquisition unit 170 being offloaded to the FPGA 111 to be processed. Furthermore, the deadline of the application processing is guaranteed with the data utilization unit 131 being in charge of the calculation processing and the output processing, and the management unit 124 enabling the processing of the data utilization unit 131 to be executed with a high priority.

FIG. 3 is a diagram illustrating an example of a configuration of the IO management table 122. The IO management table 122 is a table for managing IO information.

As in the case of Linux, the OS 120 has a Device Tree mechanism for facilitating management of a drive that controls the IO device 104 and the like. The Device Tree is a data structure describing hardware related information. For example, the Device Tree provides information on an interrupt control number (interrupt identifier) for the CPU 110 and the FPGA 111 in the calculation device 101 as well as the NW device 103 connected to the calculation device 101, on addresses (address range) of the memory for data access with the OS 120, and the like.

The IO driver unit 123 uses the function of the OS 120 to obtain information on the interrupt control number and the data access memory address from the Device Tree, and stores each of such information in a corresponding one of an IO identifier 301, an interrupt identifier 302, and an address range 303.

The information stored in the IO management table 122 is acquired with the generation unit 140 using a user IF unit 123A of the IO driver unit 123.

Figure 4:
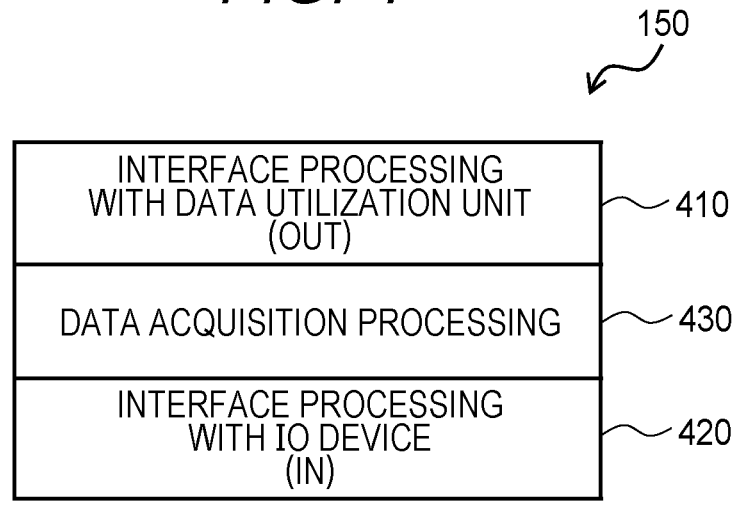
FIG. 4 is a diagram illustrating an example of a configuration of a model source according to the first embodiment.

FIG. 4 is a diagram illustrating an example of a configuration of the model source 150.

The model source 150 includes the three description parts. More specifically, a description part 410, a description part 420, and a description part 430 are included. In the description part 410, processing of "interface processing with data utilization unit (OUT)" for providing data to the data utilization unit 131 is described. In the description part 420, processing of "interface processing with IO device (IN)" for acquiring data from the NW device 103 for acquiring data from the IO device 104 is described. In the description part 430, "data acquisition processing" is described which is processing of actually acquiring data by using "interface processing with IO device (IN)" and of providing data to the data utilization unit 131 by using "interface processing with data utilization unit (OUT)".

In the description part 410, a call for a function (SET_OUT function) in the function table 141 described later is described. In the description part 420, a call for a function (GET_IN function) in the function table 141 described later is described. The description part 430 for the data acquisition processing is created by an application developer.

Note that the specific processing contents of the interface processing related function (GET_IN function) with the IO device 104 and the interface processing related function (SET_OUT function) with the data utilization unit 131 will be replaced by the processing of the generation unit 140 as will be described later.

Figure 5:
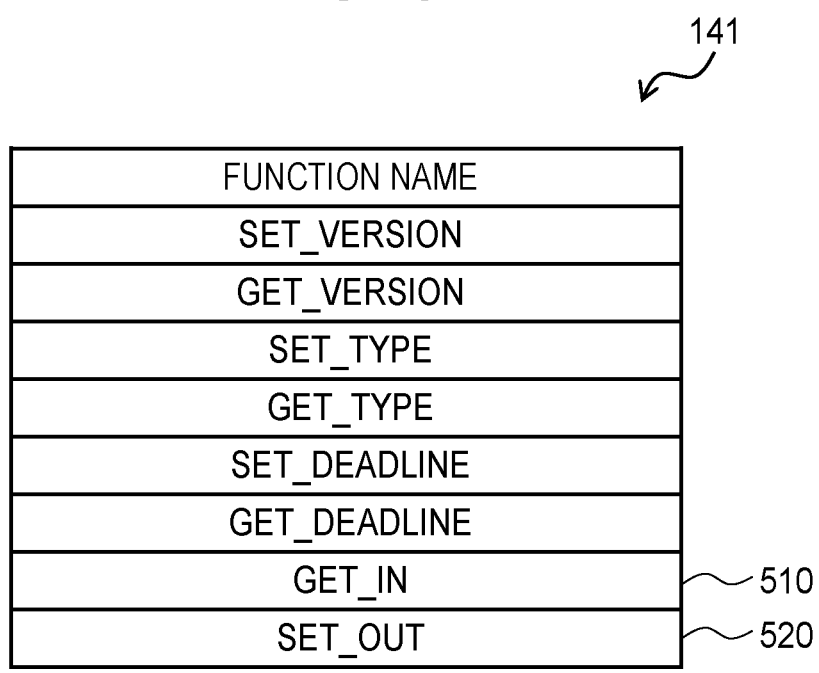
FIG. 5 is a diagram illustrating an example of a function table according to the first embodiment.

FIG. 5 is a diagram illustrating an example of the function table 141.

The functions in the function table 141 are, for example, functions (built-in functions) that can be used with a standard prepared in advance in a programming language, and are referred to as processing called by the model source 150.

The GET_IN function 510 is a function called in the "interface processing with IO device (IN)" of the model source 150. The SET_OUT function 520 is a function called in the "interface processing with the data utilization unit (OUT)" of the model source 150.

Figure 6:
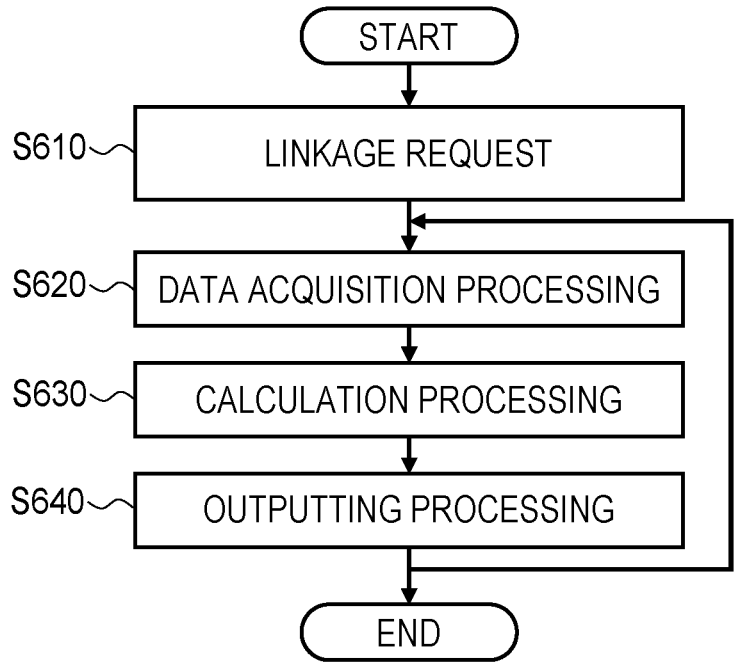
FIG. 6 is a diagram illustrating an example of processing related to a data utilization unit according to the first embodiment.

FIG. 6 is a diagram illustrating an example of processing related to the data utilization unit 131.

In step S610, the data utilization unit 131 requests the data linkage unit 132 for establishment of linkage with the OS linkage unit 121 (linkage request). Step S610 is executed in response to an instruction from a user (such as an application developer, a person in charge of environment setup, or an operator for example).

Step S610 is a step, in the preparation stage, for enabling the data utilization unit 131 to access the OS linkage unit 121 storing the data acquired by the data acquisition unit 170 from the NW device 103, to acquire the data from the data acquisition unit 170. Steps S620 to S630 are steps in the operation stage.

In step S620, the data utilization unit 131 executes data acquisition processing. For example, the data utilization unit 131 acquires data from the OS linkage unit 121.

In step S630, the data utilization unit 131 executes calculation processing on the data acquired in step S620.

In step S640, the data utilization unit 131 executes processing of outputting a result of the calculation in step S630, and then the processing proceeds to step S620. The destination of the output may be another application that executes data processing for AI and the like. It should be noted that in the application execution apparatus 100, the destination of the output is not limited.

Figure 7:
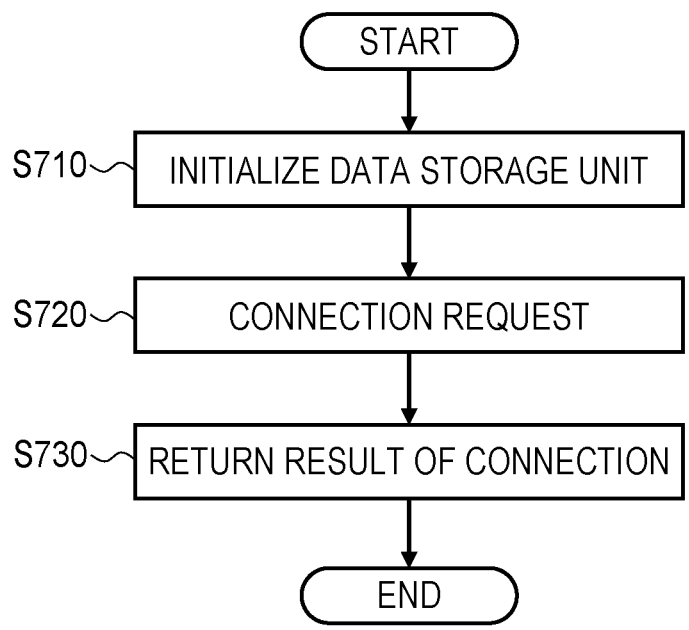
FIG. 7 is a diagram illustrating an example of processing related to a data linkage unit according to the first embodiment.

FIG. 7 is a diagram illustrating an example of processing related to the data linkage unit 132. This processing is processing for data linkage in the preparation stage, and starts in response to the linkage request in step S610.

In step S710, the data linkage unit 132 initializes (for example, clears) the data storage unit 133 linked with the OS linkage unit 121.

In step S720, the data linkage unit 132 calls the user IF unit 123A and issues a request (connection request) for connecting the data storage unit 133 to the OS linkage unit 121. The call is processed in steps S920 and S930 described later. In the application execution apparatus 100, the memory map function of mapping the memory on the side of the application side of the OS 120 onto the address of the memory in the OS 120 is used to connect the data storage unit 133 to the OS linkage unit 121. In other words, the data storage unit 133 and the OS linkage unit 121 share the same memory.

In step S730, the data linkage unit 132 returns a result (such as OK or NG) of the connection between the data storage unit 133 and the OS linkage unit 121, to the data utilization unit 131.

Figure 8:
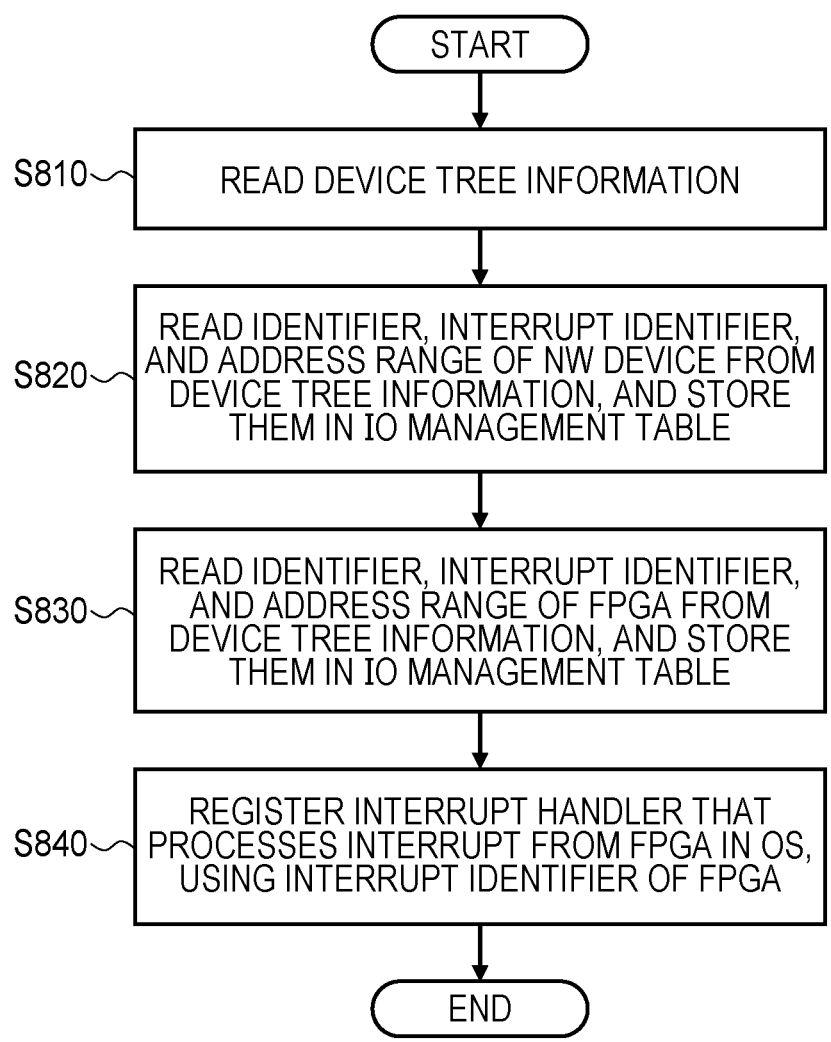
FIG. 8 is a diagram illustrating an example of processing related to an IO driver unit according to the first embodiment.

FIG. 8 is a diagram illustrating an example of processing related to the IO driver unit 123. This processing is processing for data linkage in the preparation stage, and starts in response to a user instruction for example.

In step S810, the IO driver unit 123 reads DEVICE TREE information.

The DEVICE TREE is a mechanism for providing information on an interrupt, control, a memory address for data access, and the like, for device control provided by the OS 120. It should be noted that in the application execution apparatus 100, the acquisition source of information for device control is not limited to the DEVICE TREE.

In step S820, the IO driver unit 123 reads the identifier, an interrupt identifier, and an address range of the NW device 103 from the DEVICE TREE information read in step S810, and stores them in the IO management table 122.

In step S830, the IO driver unit 123 reads the identifier, an interrupt identifier, and an address range of the FPGA 111 from the DEVICE TREE information read in step S810, and stores them in the IO management table 122.

In step S840, the IO driver unit 123 registers an interrupt handler that processes an interrupt from the FPGA 111 in the OS 120, using the interrupt identifier of the FPGA 111. The interrupt is used as means for notifying the OS 120 of completion of data acquisition by the data acquisition unit 170 offloaded to the FPGA 111, of a periodical timer event, and the like. This is a step of registering an interrupt handler so that the interrupt is processed by the OS 120. When the registered interrupt handler is processed, the management unit 124 described later is triggered.

Figure 9:
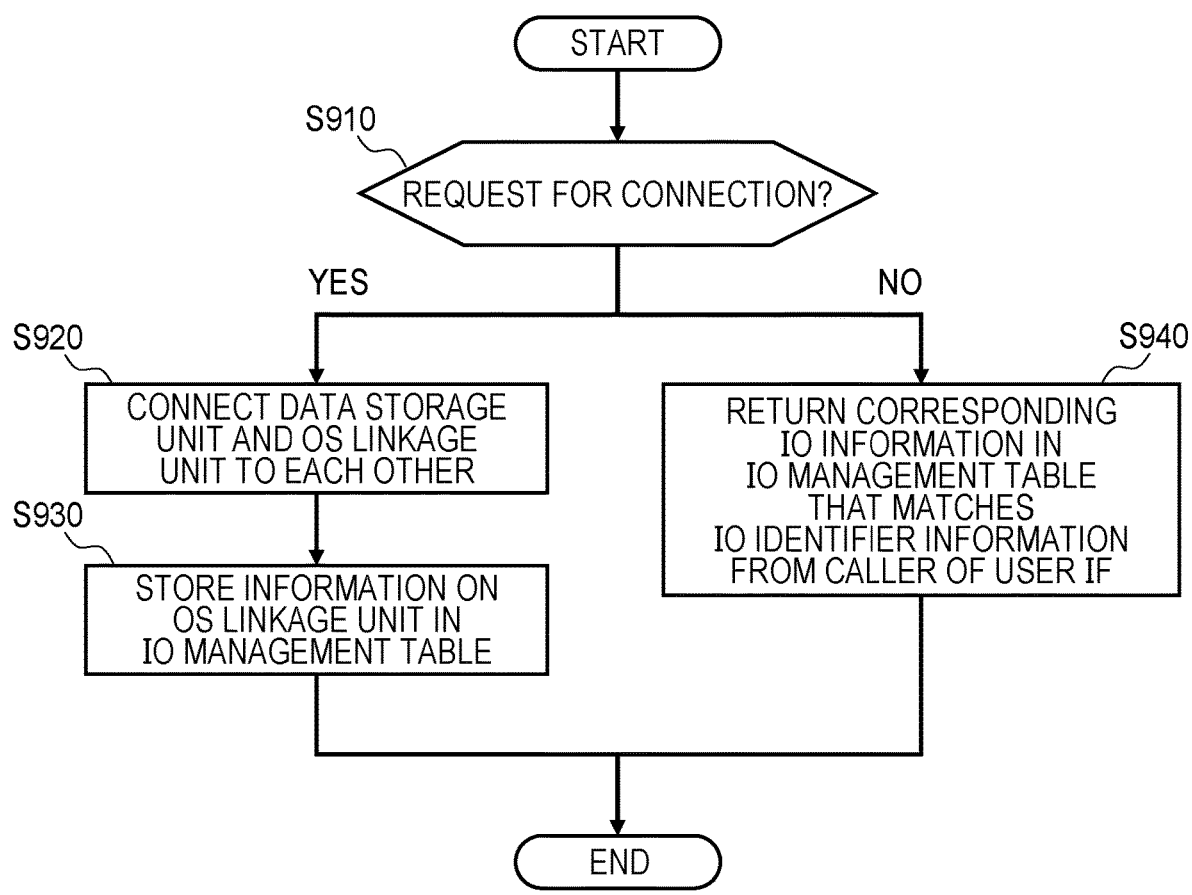
FIG. 9 is a diagram illustrating an example of processing related to a user IF unit according to the first embodiment.

FIG. 9 is a diagram illustrating an example of processing related to the user IF unit 123A. The user IF unit 123A executes (provides a user IF for) processing for a connection request, a request for acquiring IO information from the IO management table 122, and the like.

In step S910, the user IF unit 123A determines whether a request is a request for connection between the data storage unit 133 and the OS linkage unit 121. If the user IF unit 123A determines that the request is a connection request, the processing proceeds to step S920. If the user IF unit 123A determines that the request is not a connection request, the processing proceeds to step S940.

In step S920, the user IF unit 123A connects the data storage unit 133 and the OS linkage unit 121 to each other. For example, the user IF unit 123A uses the memory map function for mapping the address of the memory on the side of the application side of the OS 120 onto the address of the memory in the OS 120, to connect the data storage unit 133 and the OS linkage unit 121 to each other. The mapped memory address information is provided to the data linkage unit 132.

In step S930, the user IF unit 123A stores the information on the OS linkage unit 121 in the IO management table 122. In the IO identifier 301, "OS linkage unit" is registered, and in the interrupt identifier 302, a number of an interrupt that triggers the management unit 124 is registered. In the address range 303, a memory address (address range) in which the memory of the data storage unit 133 is mapped onto an address of the memory in the OS 120 is registered. Note that the information on the OS linkage unit 121 is used, for example, for the generation unit 140 to implement the processing of "interface processing with data utilization unit (OUT)" in the configuration of the model source 150 in step S1140 described later.

In step S940, the user IF unit 123A returns the corresponding IO information in the IO management table 122 that matches the IO identifier information from the caller of the user IF. This is a step of processing an acquisition request for IO information of the NW device 103 and the OS linkage unit 121, required for implementing "GET_IN function" and "SET_OUT function" in the function table 141 in the processing of the generation unit 140 described later. For example, for a request from the generation unit 140, more specifically, a request from the function analysis unit 142, "NW device" or "OS linkage unit" is designated as the IO identifier information.

Figure 10:
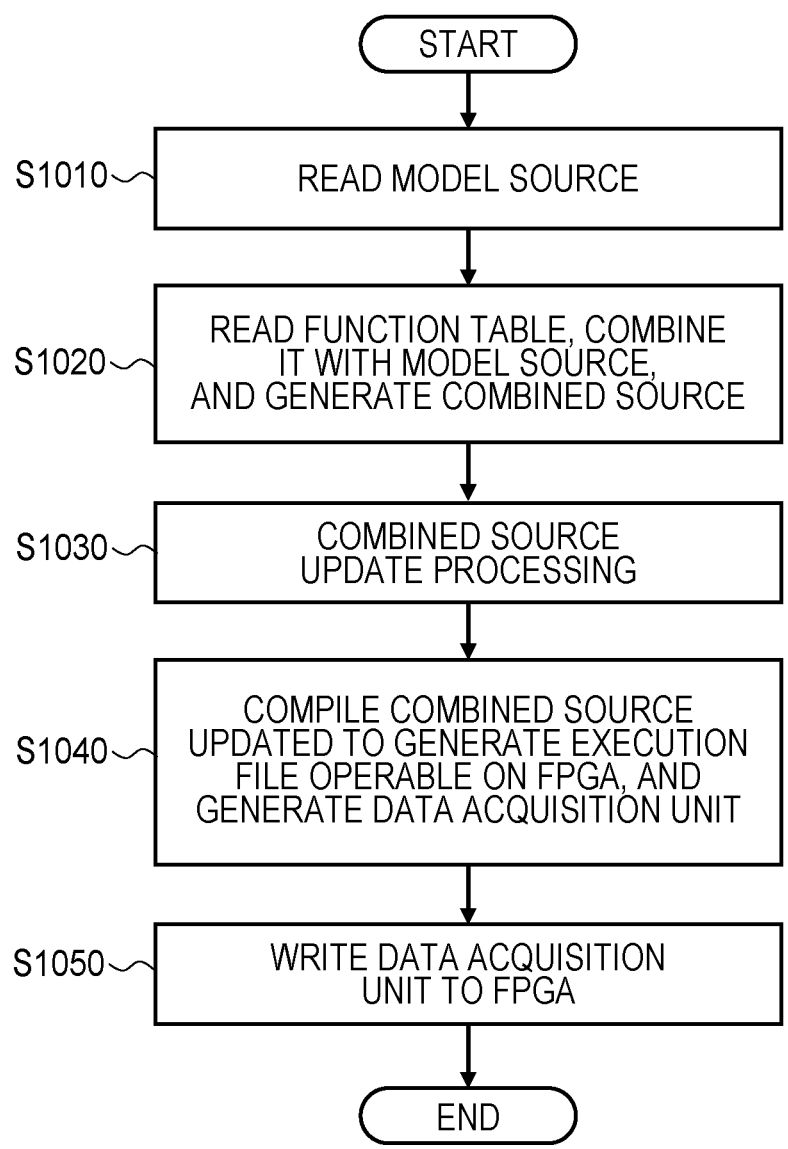
FIG. 10 is a diagram illustrating an example of processing related to a generation unit according to the first embodiment.

FIG. 10 is a diagram illustrating an example of processing related to the generation unit 140. This processing is in the preparation stage for the generation of the data acquisition unit 170, and starts in response to a user information for example.

In step S1010, the generation unit 140 reads the model source 150. Note that the model source 150 is created by an application developer, and an example of the model source 150 is illustrated in FIG. 4.

In step S1020, the generation unit 140 reads the function table 141 (built-in function), and combines it with the model source 150 to generate a combined source 160.

In step S1030, the generation unit 140 performs combined source update processing. In the combined source update processing, the function analysis unit 142 is called, and the processing for the interface processing with the IO device 104 for acquiring data from the NW device 103 and the interface processing with the data utilization unit 131 for writing data to the OS linkage unit 121 are completed, whereby the combined source 160 is updated. Details will be described later with reference to FIG. 11.

In step S1040, the generation unit 140 compiles the combined source 160 updated in step S1030 to generate an execution file operable on the FPGA 111, and generates the data acquisition unit 170. In the application execution apparatus 100, a compiler that generates the execution file from the combined source 160 is not limited.

In step S1050, the generation unit 140 calls the offload unit 125 and writes the data acquisition unit 170 to the FPGA 111. In the application execution apparatus 100, the offload unit 125 uses a function provided by the OS 120 (general-purpose OS). For example, in the OS 120, mapping with a file system is performed so that reading from and writing to a write area of the data acquisition unit 170 included in the FPGA 111 can be performed on the user application side. Thus, the offload unit 125 can be offloaded to the FPGA 111 by normal file writing.

Figure 11:
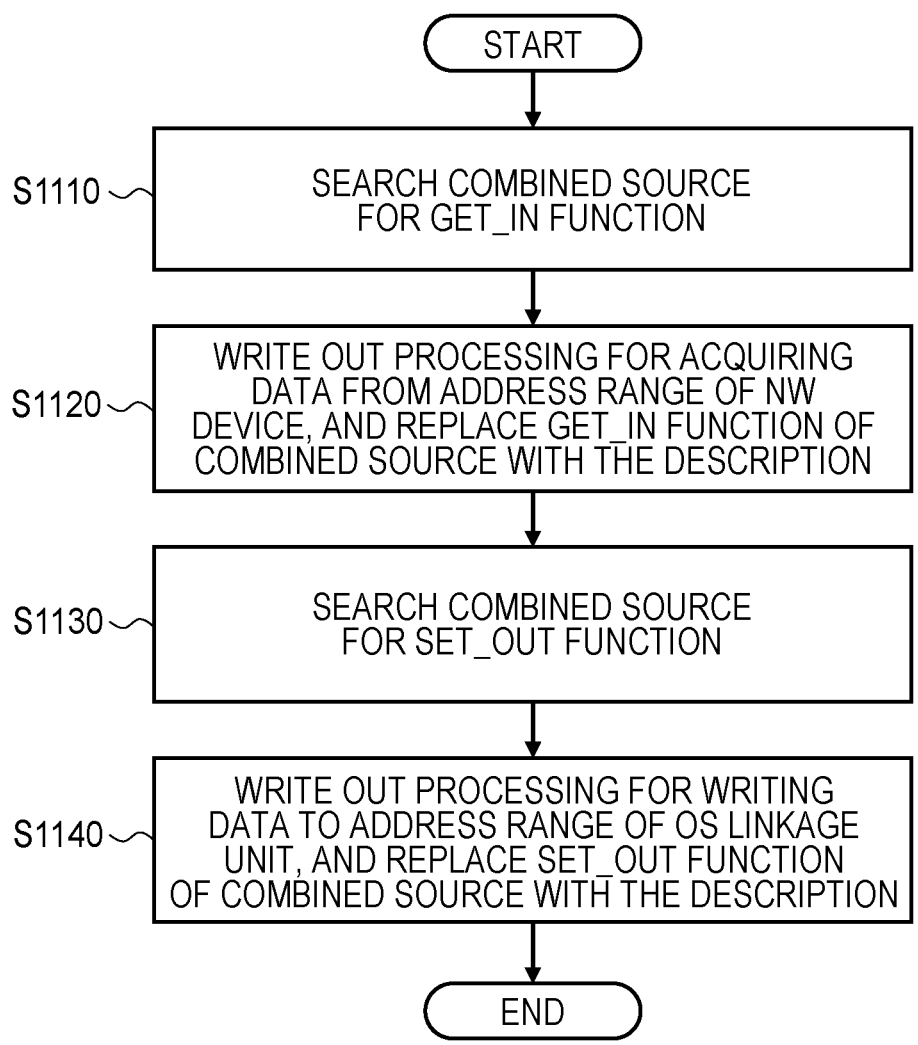
FIG. 11 is a diagram illustrating an example of processing related to a function analysis unit according to the first embodiment.

FIG. 11 is a diagram illustrating an example of processing related to the function analysis unit 142 (combined source update processing).

In step S1110, the function analysis unit 142 searches the combined source 160 for a GET_IN function.

In step S1120, the function analysis unit 142 calls the user IF unit 123A of the IO driver unit 123, reads the address range of the NW device 103 from the IO management table 122, writes out processing for acquiring data from the address in the read address range, and replaces the GET_IN function (description part 420) of the combined source 160 with the description. This is a step for implementing processing in which the NW device 103 acquires data from the IO device 104, and the data acquisition unit 170 acquires data acquired by the NW device 103. Note that reading of the address range of the NW device 103 from the IO management table 122 is performed in response to an IO information acquisition request with the "NW device" designated.

In step S1130, the function analysis unit 142 searches the combined source 160 for a SET_OUT function.

In step S1140, the function analysis unit 142 calls the user IF unit 123A of the IO driver unit 123, reads out the address range of the OS linkage unit 121 from the IO management table 122, writes out processing for writing data to an address in the read address range, and replaces the SET_OUT function (description part 410) of the combined source 160 with the description. Note that reading of the address range of the OS linkage unit 121 from the IO management table 122 is performed in response to an IO information acquisition request with the "OS linkage unit" designated.

Figure 12:
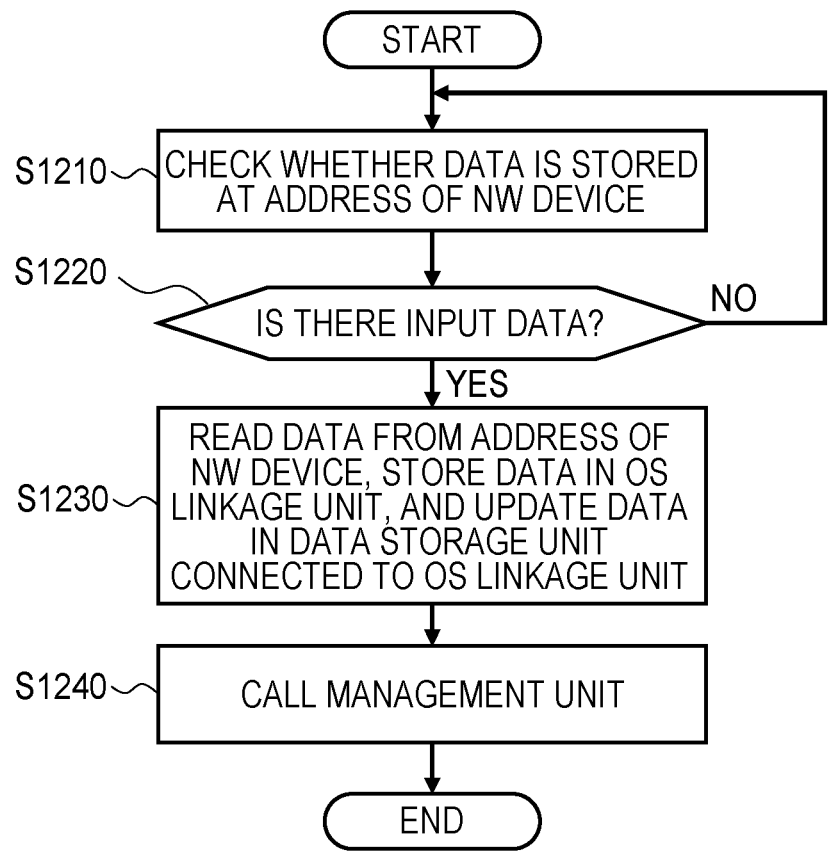
FIG. 12 is a diagram illustrating an example of processing related to a data acquisition unit according to the first embodiment.

FIG. 12 is a diagram illustrating an example of processing related to the data acquisition unit 170. The data acquisition unit 170 is written to the FPGA 111 by the offload unit 125 and operates on the FPGA 111.

In step S1210, the data acquisition unit 170 checks whether data is stored at the address of the NW device 103.

In step S1220, the data acquisition unit 170 determines whether there is data (input data) at the address of NW device 103. When the data acquisition unit 170 determines that there is input data, the processing proceeds to step S1230. If the data acquisition unit 170 determines that there is no input data, the processing proceeds to step S1210

In step S1230, the data acquisition unit 170 reads data from the address of the NW device 103, stores the data in the OS linkage unit 121, and updates the data in the data storage unit 133 connected to the OS linkage unit 121.

In step S1240, the data acquisition unit 170 generates an interrupt for the OS 120, calls the interrupt handler registered in step S840, and calls the management unit 124.

Figure 13:
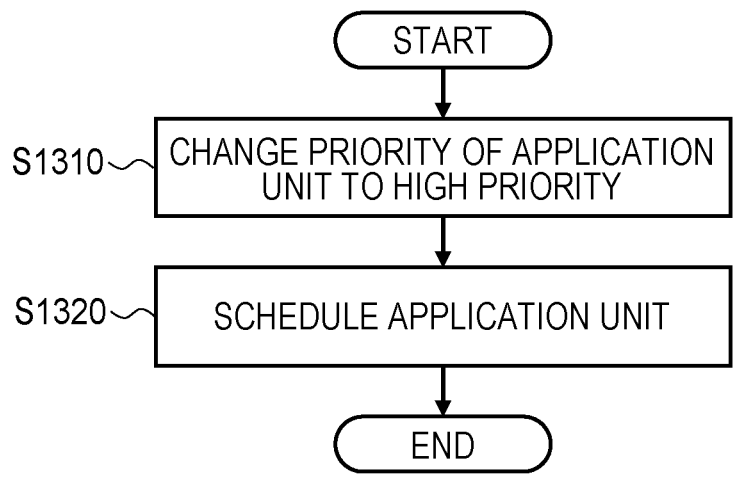
FIG. 13 is a diagram illustrating an example of processing related to a management unit according to the first embodiment.

FIG. 13 is a diagram illustrating an example of processing related to the management unit 124. Such processing starts in response to a call from the interrupt handler.

In step S1310, the management unit 124 changes the priority of the application unit 130 to a high priority (for example, the highest priority). This is a step for prioritizing the processing of the data utilization unit 131 of the application unit 130. The processing of the data utilization unit 131 is prioritized so that the deadline of application processing can be met.

In step S1320, the management unit 124 schedules the application unit 130. A job of the application unit 130 that has been provided with a high priority in step S1310 is positioned at the beginning of the schedule queue held by the OS 120. The CPU 110 selects and executes the job at the beginning of the schedule queue of the management unit 124. When the application unit 130 is scheduled, the processing of the data utilization unit 131 (for example, step S620 to step S640) is executed.

In the above-described configuration, the data acquisition unit of the application is implemented by the FPGA, and not by the CPU that implements a general-purpose OS that executes various types of processing. Therefore, the punctuality of application processing in a computer can be guaranteed.

In the configuration described above, the job of the application data utilization unit is given a higher priority to be processed by the CPU, so that the deadline of the application process can be met.

According to the present embodiment, it is possible to guarantee the real-time property of an application in an apparatus including a general-purpose OS.

(2) Second Embodiment

The present embodiment is mainly different from the first embodiment in that the data acquisition unit 170 is offloaded to an offload destination designated by the user. In the present embodiment, a configuration different from the first embodiment will be mainly described.

Figure 14:
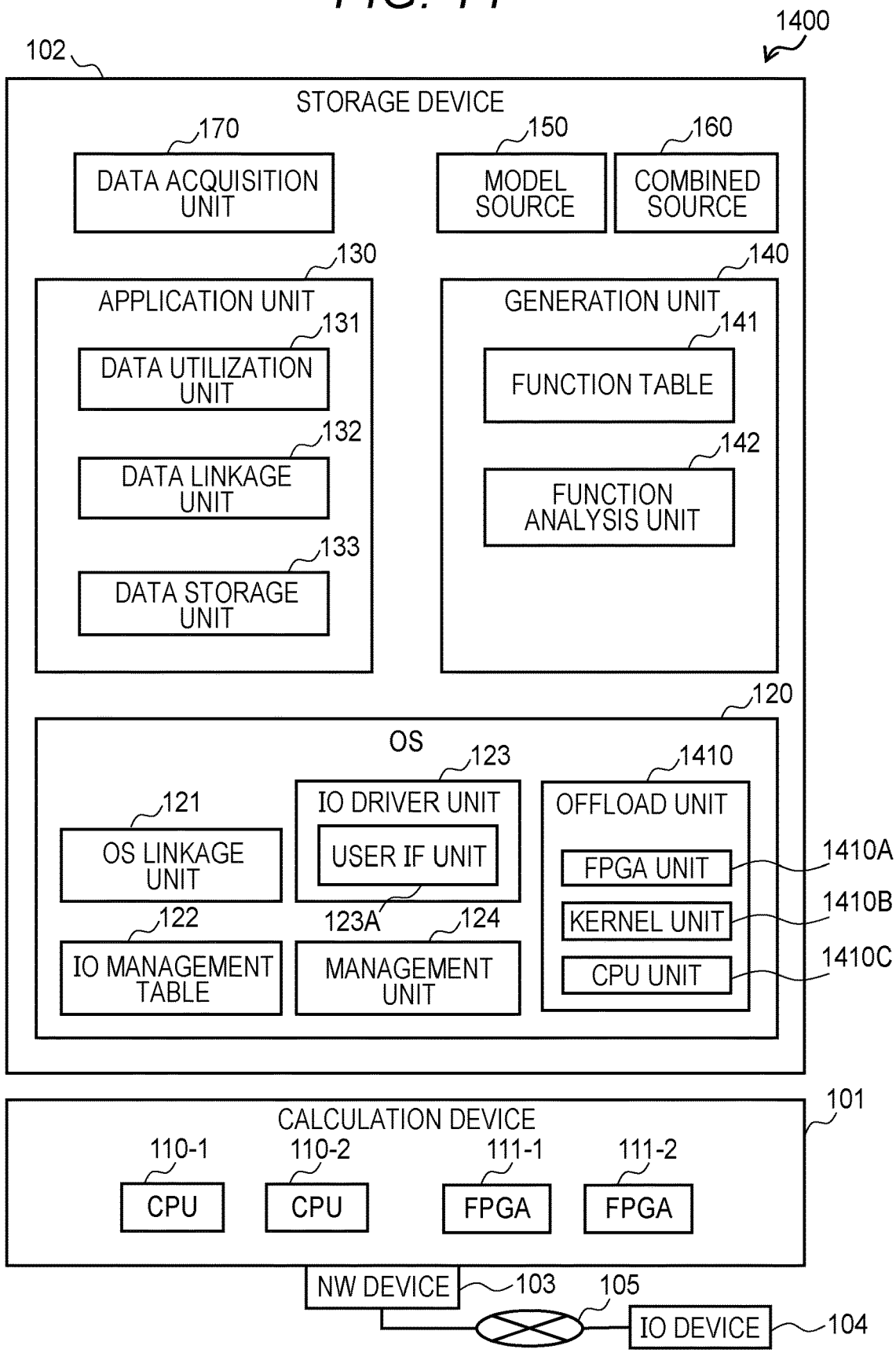
FIG. 14 is a diagram illustrating an example of a configuration related to an application execution apparatus according to a second embodiment.

FIG. 14 is a diagram illustrating an example of a configuration related to an application execution apparatus 1400 according to the present embodiment.

In the configuration described in the first embodiment, the data acquisition unit 170 is offloaded to the FPGA 111. In the present embodiment, functions (an FPGA unit 1410A, a kernel unit 1410B, and a CPU unit 1410C) with which an offload destination can be selected is introduced to the offload unit 125, whereby the offloading destination is not limited to the FPGA 111, and the unit can be offloaded to the CPU 110 or in the OS 120 as a kernel (kernel module) of the OS 120.

For example, the combined source 160 is generated by providing a description part for describing SET_TYPE of the function table 141 in the model source 150, designating an offload destination in this description part, and converting the description part 410 (SET_OUT function) and the description part 420 (GET_IN function) in the model source 150 into processing corresponding to the offload destination by the function analysis unit 142. The data acquisition unit 170 is generated by compiling the combined source 160 generated, and is offloaded to the offload destination.

Next, details of the configuration for offloading the data acquisition unit 170 to a kernel of the OS 120 will be described.

Here, a kernel of the OS 120 assumed in the present embodiment has the same function as extended Berkeley Packet Filter (eBPF) of Linux, for example. Usually, with Linux, data acquisition from the NW device 103 is processed by an NW processing module. The eBPF provides a mechanism for user-specified processing during data acquisition, and user-designated processing can be registered using this mechanism. Thus, for the offloading into the OS 120 as a kernel of the OS 120, the processing of the data acquisition unit 170 may be converted as user processing provided by the eBPF in the processing of the function analysis unit 142.

Figure 15:
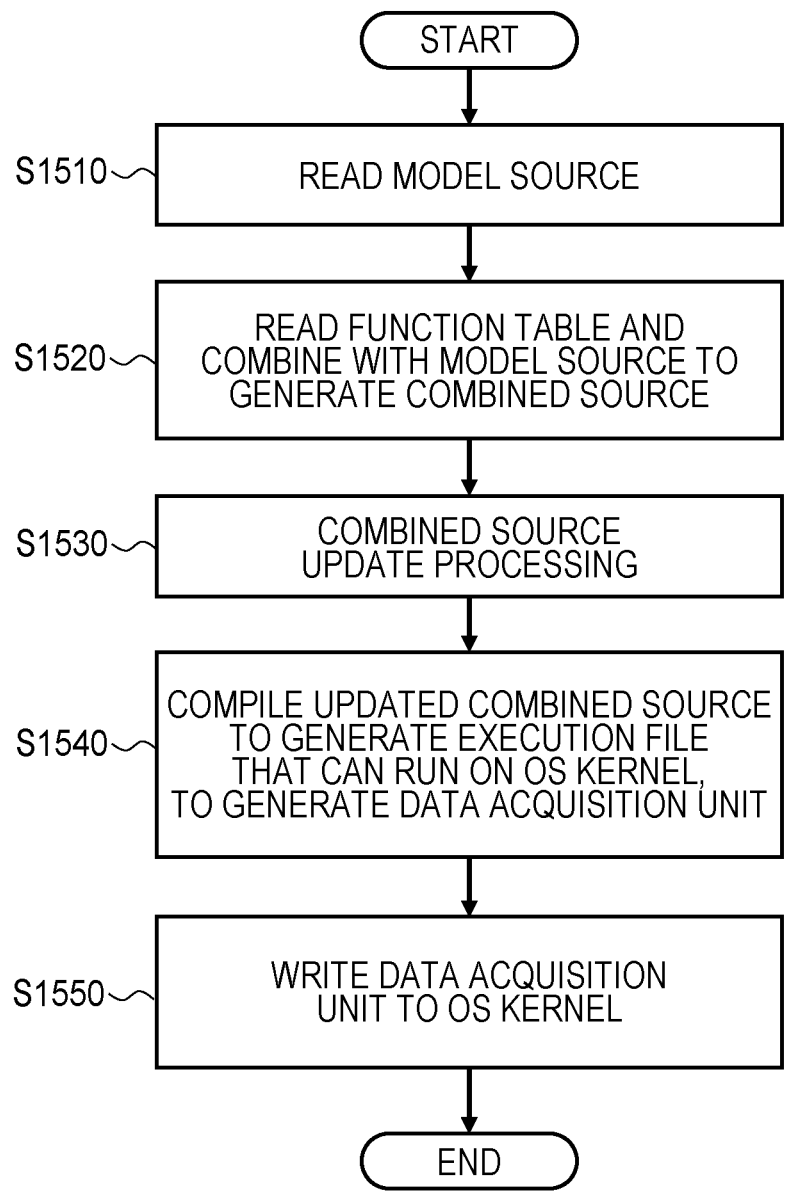
FIG. 15 is a diagram illustrating an example of processing related to a generation unit according to the second embodiment.

FIG. 15 is a diagram illustrating an example of processing related to the generation unit 140 (processing for offloading the data acquisition unit 170 to a kernel of the OS 120).

In step S1510, the generation unit 140 reads the model source 150.

In step S1520, the generation unit 140 reads the function table 141 (built-in function), and combines it with the model source 150 to generate the combined source 160.

In step S1530, the generation unit 140 executes combined source update processing. In the combined source update processing, the function analysis unit 142 is called, and the processing for the interface processing with the IO device 104 for acquiring data from the NW device 103 and the interface processing with the data utilization unit 131 for writing data to the OS linkage unit 121 are completed, whereby the combined source 160 is updated. Details will be described later with reference to FIG. 16.

In step S1540, the generation unit 140 compiles the combined source 160 updated in step S1530 to generate the data acquisition unit 170 in order to generate an execution file operable as a kernel (internal module) of the OS 120. In the application execution apparatus 1400, a compiler that generates the execution file from the combined source 160 is not limited.

In step S1550, the generation unit 140 calls the kernel unit 1410B of the offload unit 125, and loads the data acquisition unit 170 as a kernel of the OS 120. The application execution apparatus 1400 generates an eBPF module as described above. The compiler for the eBPF module may be the one provided in Linux.

Figure 16:
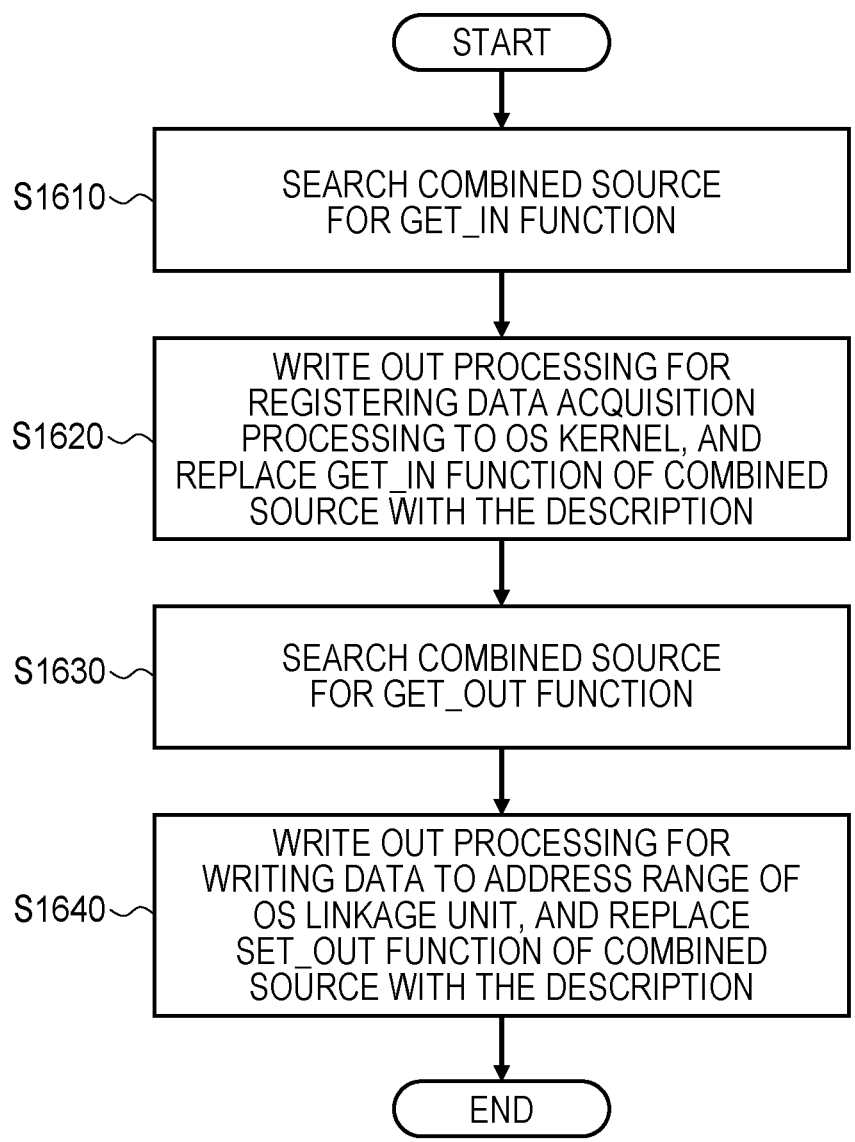
FIG. 16 is a diagram illustrating an example of processing related to a function analysis unit according to the second embodiment.

FIG. 16 is a diagram illustrating an example of processing related to the function analysis unit 142 (combined source update processing).

In step S1610, the function analysis unit 142 searches the combined source 160 for a GET_IN function.

In step S1620, the function analysis unit 142 writes out processing of registering the data acquisition processing to the kernel of the OS 120 that acquires data from the NW device 103, and replaces the GET_IN function (description part 420) of the combined source 160 with the description. This is a step for implementing processing in which the NW device 103 acquires data from the IO device 104, and the data acquisition unit 170 acquires data acquired by the NW device 103.

In step S1630, the function analysis unit 142 searches the combined source 160 for a SET_OUT function.

In step S1640, the function analysis unit 142 calls the user IF unit 123A of the IO driver unit 123, reads out the address range of the OS linkage unit 121 from the IO management table 122, writes out processing for writing data to an address in the read address range, and replaces the SET_OUT function (description part 410) of the combined source 160 with the description.

In the present embodiment, an example in which the data acquisition unit 170 is offloaded to the kernel is described. The mechanism for offloading the data acquisition unit 170 to the CPU 110 is similar to that in the case of offloading to the FPGA 111 or a kernel of the OS 120, or the like. Thus, the description thereof will be omitted.

In the configuration described above, the data acquisition unit 170 is offloaded to a kernel space instead of an application space (user space), so that the data acquisition from the IO device 104 can be performed in the kernel space, whereby overhead involved in spatial movement can be eliminated. The application space is a calculation resource allocated to an application and is a resource that can be directly accessed by the running application. The kernel space is a calculation resource allocated to a kernel and is a resource that cannot be directly accessed by an application.

In the configuration described above, the offload destination can be designated with the model source 150 and the function table 141, and the user can write the processing (description part 430) of the data acquisition unit 170 that does not depend on the offload destination.

According to the present embodiment, the offload destination is designated so that the data acquisition unit corresponding to the designated offload destination is generated, whereby the user can easily offload the data acquisition unit to the desired offload destination.

(3) Third Embodiment

The present embodiment is mainly different from the first embodiment in that the generation unit 140 determines an appropriate offload destination. In the present embodiment, a configuration different from the first embodiment will be mainly described.

Figure 17:
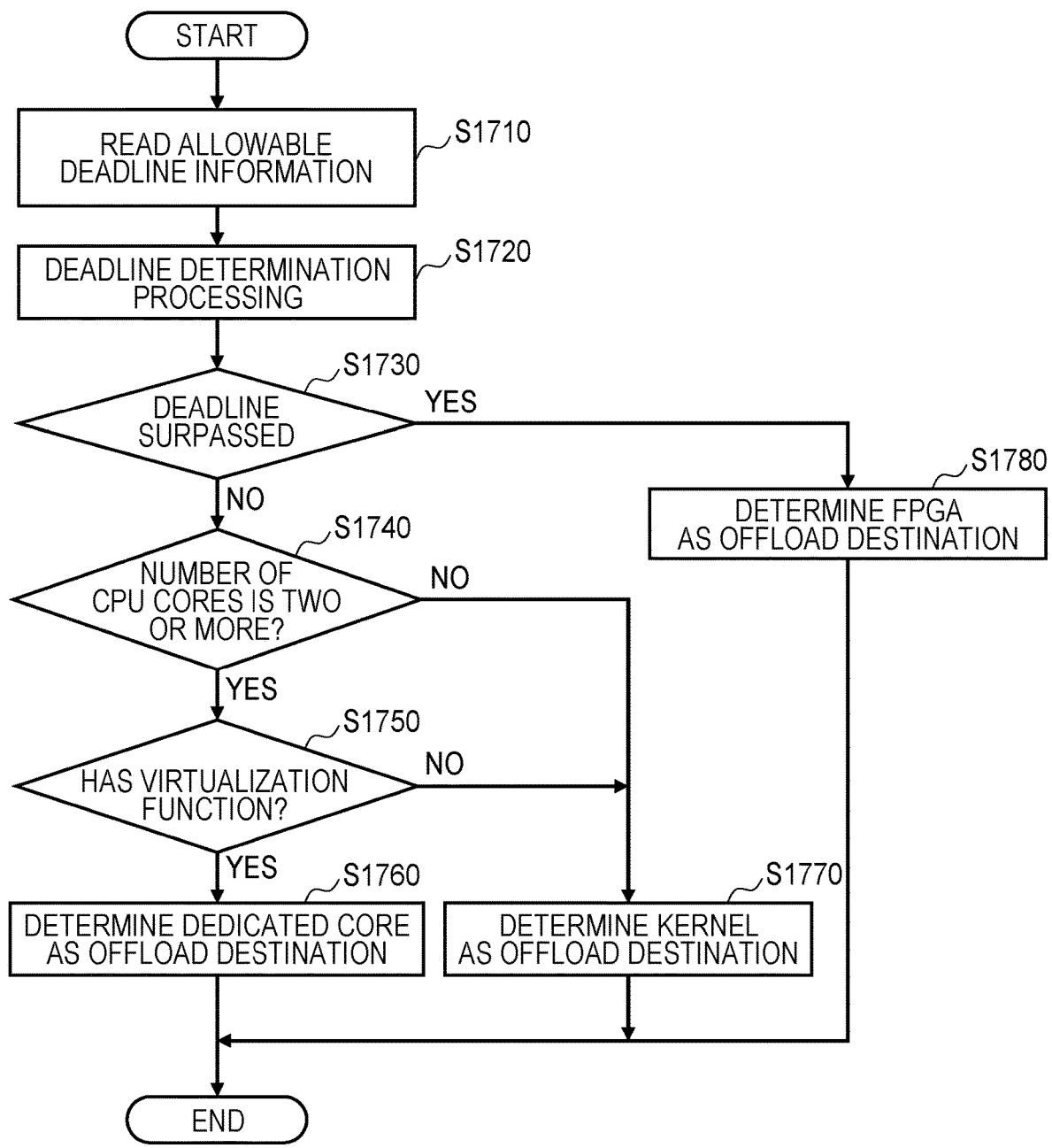
FIG. 17 is a diagram illustrating an example of processing related to a generation unit according to a third embodiment.

FIG. 17 is a diagram illustrating an example of processing related to the generation unit 140 (processing of determining an offload destination).

In step S1710, the generation unit 140 reads information on allowable deadlines (allowable deadline information). For example, the allowable deadline information is set in the model source 150 by an application developer. The allowable deadline information may be a value or a range of the allowable deadline.

In step S1720, the generation unit 140 executes deadline determination processing. In the deadline determination processing, it is determined whether the application processing meets the deadline (whether the data acquisition unit 170 offloaded to the CPU 110 results in the deadline surpassed). Details of the deadline determination processing will be described later with reference to FIG. 18.

In step S1730, when the generation unit 140 determines that the deadline will be surpassed (the result of the deadline determination described later is NG), the processing proceeds to step S1780. When it is determined that the deadline will not be surpassed (the result of the deadline determination described later is OK), the processing proceeds to step S1740.

In step S1740, the generation unit 140 determines whether the number of cores of the CPU 110 is two or more (plural). When the generation unit 140 determines that the number is two or more, the processing proceeds to step S1750. when it is determined that the number is not two or more, the processing proceeds to step S1770.

In step S1750, the generation unit 140 determines whether the CPU 110 has a virtualization function. When the generation unit 140 determines that the CPU 110 has a virtualization function, the processing proceeds to step S1760. When it is determined that the CPU 110 does not have a virtualization function, the processing proceeds to step S1770.

In step S1760, the generation unit 140 determines to offload the data acquisition unit 170 to a dedicated core, and the processing is terminated. For example, when a first CPU core that executes OS 120 is allocated to a first logical partition and a second CPU core is allocated to a second logical partition, the generation unit 140 determines to perform offloading to the second CPU core. Note that the generation unit 140 subsequently generates the data acquisition unit 170 in a manner that is the same as that described with reference with FIGS. 10, 15, and the like. For example, the generation unit 140 calls the function analysis unit 142, completes the processing for the interface processing with the IO device 104 for acquiring data from the NW device 103 and the interface processing with the data utilization unit 131 for writing data to the OS linkage unit 121 to update the combined source 160, and compiles the updated combined source 160 for generating an execution file operable on the dedicated core, to generate the data acquisition unit 170.

In step S1770, the generation unit 140 determines to offload the data acquisition unit 170 to a kernel, and the processing is terminated. The generation unit 140 subsequently executes the processing illustrated in FIG. 15.

In step S1780, the generation unit 140 determines to offload the data acquisition unit 170 to the FPGA 111, and the processing is terminated. The generation unit 140 subsequently executes the processing illustrated in FIG. 10.

Figure 18:
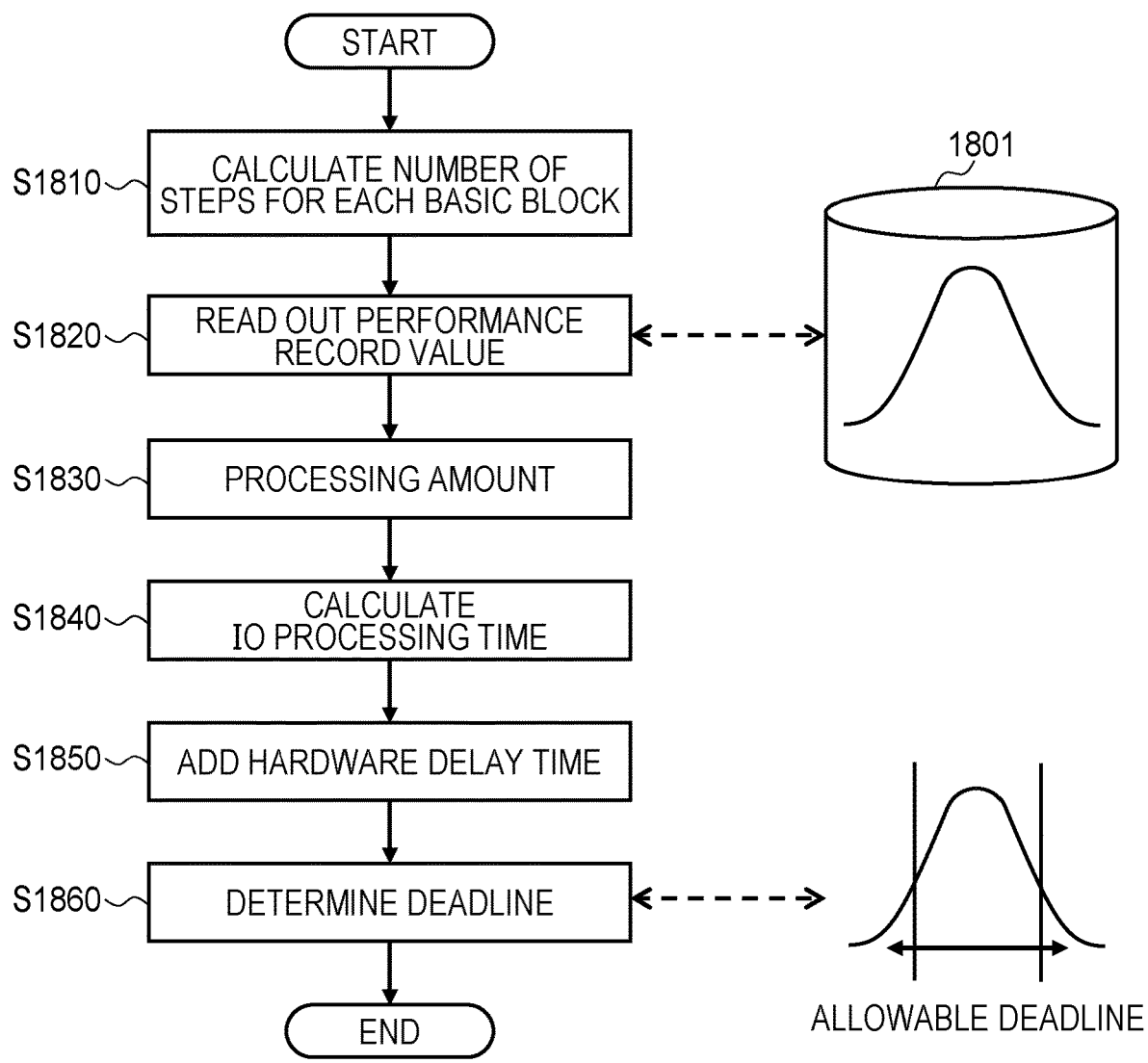
FIG. 18 is a diagram illustrating an example of a flowchart related to deadline determination processing according to the third embodiment.

FIG. 18 is a diagram illustrating an example of a flowchart related to the deadline determination processing.

In step S1810, the generation unit 140 refers to the combined source 160 after the combined source update processing, and calculates the number of steps for each basic block (block of processes without branching such as IF statements).

In step S1820, the generation unit 140 reads a performance record value 1801. The performance record value 1801 is an average, variance, or the like of the performance values of the CPU 110, and is information on a period of time estimated to be required for the number of steps. It is assumed herein that the performance record value 1801 is acquired by a benchmark tool or the like for measuring the performance of the CPU 110, and is registered in the storage device 102.

In step S1830, the generation unit 140 calculates main processing time (processing amount) required for application processing based on the performance record value 1801 and the number of steps.

In step S1840, the generation unit 140 adds IO processing time to the processing time.

In step S1850, the generation unit 140 adds a hardware delay value (latency) to the time obtained by adding the IO processing time to the processing time, to calculate the application processing time.

In step S1860, the generation unit 140 refers to the allowable deadline information, to determine whether the application processing time meets the deadline (for example, whether deadline application processing time is satisfied). Then, the processing is terminated with the determination result being OK when it is determined that the deadline is met, and is terminated with the determination result being NG when it is determined that the deadline is not met.

According to the present embodiment, an appropriate offload destination is selected and the data acquisition unit is offloaded thereto. Thus, the real-time of the application can be appropriately guaranteed even for an application execution apparatus with a calculation device having a different configuration.

(4) Other Embodiments

In the above-described embodiment, a case where the present invention is applied to an application execution apparatus is described. However, the present invention is not limited to this, and can be widely applied to various other systems, apparatuses, methods, and programs.

In the above-described embodiment, the configuration of each table is an example, and one table may be divided into two or more tables, or all or part of the two or more tables may be a single table.

In the above-described embodiment, for convenience of explanation, various types of data have been described using XX tables and XX files. However, the data structure is not limited and may be expressed as XX information.

In the above description, information such as programs, tables, and files for implementing each function may be stored in a storage device such as a memory, a hard disk, a Solid State Drive (SSD), or a storage medium such as an IC card, an SD card, a DVD, or the like.

The present invention has the characteristic configuration described below, for example.

An application execution apparatus (for example, the application execution apparatus 100, the application execution apparatus 1400) that executes an application including a data acquisition unit (for example, the data acquisition unit 170) that acquires data transmitted from an IO device (for example, the IO device 104) and a data utilization unit (for example, the data utilization unit 131) that utilizes the data acquired by the data acquisition unit is characterized by comprising: a first calculation device (for example, the CPU 110, the FPGA 111, or may be other calculation devices such as a GPU) that implements the data acquisition unit in a first space (for example, a kernel space, on the FPGA 111) in which the application is able to be started after an occurrence of an event for starting the application within a time required for the application; a data linkage unit (for example, the data linkage unit 132) that links the data acquired by the data acquisition unit to the data utilization unit; and a second calculation device (for example, the CPU 110, the FPGA 111) that implements the data utilization unit in a second space (for example, an application space) different from the first space. It is noted that the first calculation device may be the same as or different from the second calculation device. The second space is a space involving more interference with the processing other than that of the data utilization unit described above (for example, processing of another application executed in an application space, processing in a kernel executed by the OS 120, and processing by the IO driver unit 123) than that in the first space.

In the configuration described above, for example, the data acquisition unit is arranged in a calculation device that achieves the punctuality, so that a failure to acquire data due to interference with the other processing can be prevented. Thus, even in an apparatus including a general-purpose OS, the punctuality of the application can be achieved with the fluctuation of the performance on the general-purpose OS suppressed.

The application execution apparatus is characterized by comprising a generation unit (for example, the generation unit 140) that generates from a model source (for example, the model source 150) including a first description (for example, the description part 410) indicating a function (for example, the SET_OUT function) of designating interface processing with the data utilization unit, a second description (for example, the description part 420) indicating a function (for example, the GET_IN function) of designating interface processing with the IO device, and a third description (for example, the description part 430) indicating data acquisition processing, a combined source (for example, the combined source 160) in which the first description and the second description are converted into a description corresponding to the first calculation device, and compiles the combined source generated to generate the data acquisition unit.

In the configuration described above, for example, when a function designating the interface processing with the data utilization unit and a function designating the interface processing with the IO device are described, a combined source is generated with the first description and the second description converted into the descriptions corresponding to the first calculation device. Thus, a user's work load for associating the data acquisition unit with the first calculation device can be reduced.

Note that the data acquisition unit generated can be offloaded to the first calculation device by the offload unit (for example, the offload unit 125), or may be manually offloaded to the first calculation device by the user.

The application execution apparatus is characterized by comprising a generation unit (for example, the generation unit 140) that generates from a model source including a first description indicating a function of designating interface processing with the data utilization unit, a second description indicating a function of designating interface processing with the IO device, a third description indicating data acquisition processing, and a fourth description (for example, the description part for describing SET_TYPE) designating a calculation device that executes the data acquisition unit, a combined source in which the first description and the second description are converted into a description corresponding to the calculation device designated by the fourth description, and compiles the combined source generated to generate the data acquisition unit.

For example, in the configuration described above, when the fourth description designating a calculation device is provided, a combined source corresponding to the designated calculation device is generated. Thus, a user's work load for associating the data acquisition unit with the designated calculation device can be reduced.

The application execution apparatus is characterized by comprising a generation unit (for example, the generation unit 140) that generates the data acquisition unit from a model source, characterized in that the second calculation device is a calculation device (for example, the CPU 110-1) different from the first calculation device (for example, the CPU 110-2, the FPGA 111), and the generation unit determines whether the data acquisition unit is executable by the second calculation device and generates the data acquisition unit by changing the model source to correspond to the first calculation device upon determining that the data acquisition unit is not executable by the second calculation device.

In the configuration described, for example, the first calculation device implements the data acquisition unit when the second calculation device cannot implement the data acquisition unit. Thus, a situation where the first calculation device is used in vain is less likely to occur.

The application execution apparatus is characterized in that the second calculation device is provided with an operating system (for example, the OS 120), and the generation unit determines whether the second calculation device includes a plurality of cores upon determining that the data acquisition unit is executable by the second calculation device, and generates the data acquisition unit by changing the model source to correspond to a kernel of the operating system upon determining that the second calculation device does not include the plurality of cores.

In the configuration described above, for example, a calculation device not including a plurality of cores can be employed as the second calculation device.

The application execution apparatus is characterized in that the generation unit determines whether the data acquisition unit is provided with a dedicated core upon determining that the second calculation device includes the plurality of cores, and generates the data acquisition unit by changing the model source to correspond to the dedicated core upon determining that the dedicated core is provided.

In the configuration described above, for example, a calculation device including a plurality of cores can be employed as the second calculation device.

The application execution apparatus is characterized by comprising a management unit (for example, the management unit 124) that manages a schedule of processing executed in the second space, characterized in that the management unit performs scheduling with processing of the data utilization unit prioritized.

In the configuration described above, for example, execution of the processing of the data utilization unit prioritized, so a fluctuation regarding the data utilization unit can be absorbed (the time until the start of the process is shortened). Thus, a failure to meet the deadline of the application is less likely to occur.

In addition, the above-described configurations may be changed, rearranged, combined, or omitted as appropriate without departing from the gist of the present invention.

With the above-described configurations, the real-time property of the application can be achieved.

REFERENCE SIGNS LIST 100 application execution apparatus
101 calculation device
131 data utilization unit
132 data linkage unit
170 data acquisition unit

The invention claimed is:

1. An application execution apparatus that executes an application including a data acquisition unit that acquires data transmitted from an IO device and a data utilization unit that utilizes the data acquired by the data acquisition unit, the application execution apparatus comprising:
a first calculation device that implements the data acquisition unit in a first space, of a plurality of application spaces and kernel spaces, in which the application is able to be started after an occurrence of an event for starting the application within a time required for the application;
a data linkage unit that links the data acquired by the data acquisition unit to the data utilization unit;
a second calculation device that implements the data utilization unit in a second space, of the plurality of application spaces and kernel spaces, different from the first space; and
a generation unit that generates from a model source including a first description indicating a function of designating interface processing with the data utilization unit, a second description indicating a function of designating interface processing with the IO device, and a third description indicating data acquisition processing, a combined source in which the first description and the second description are converted into a description corresponding to the first calculation device, and compiles the combined source generated to generate the data acquisition unit.

2. The application execution apparatus according to claim 1, further comprising a management unit that manages a schedule of processing executed in the second space, characterized in that the management unit performs scheduling with processing of the data utilization unit prioritized.

3. An application execution apparatus that executes an application including a data acquisition unit that acquires data transmitted from an IO device and a data utilization unit that utilizes the data acquired by the data acquisition unit, the application execution apparatus comprising:
a first calculation device that implements the data acquisition unit in a first space in which the application is able to be started after an occurrence of an event for starting the application within a time required for the application;
a data linkage unit that links the data acquired by the data acquisition unit to the data utilization unit;
a second calculation device that implements the data utilization unit in a second space different from the first space; and
a generation unit that generates from a model source including a first description indicating a function of designating interface processing with the data utilization unit, a second description indicating a function of designating interface processing with the IO device, a third description indicating data acquisition processing, and a fourth description designating a calculation device that executes the data acquisition unit, a combined source in which the first description and the second description are converted into a description corresponding to the calculation device designated by the fourth description, and compiles the combined source generated to generate the data acquisition unit.

4. An application execution apparatus that executes an application including a data acquisition unit that acquires data transmitted from an IO device and a data utilization unit that utilizes the data acquired by the data acquisition unit, the application execution apparatus comprising:
a first calculation device that implements the data acquisition unit in a first space in which the application is able to be started after an occurrence of an event for starting the application within a time required for the application;
a data linkage unit that links the data acquired by the data acquisition unit to the data utilization unit;
a second calculation device that implements the data utilization unit in a second space different from the first; and
a generation unit that generates the data acquisition unit from a model source,
wherein the second calculation device is a calculation device different from the first calculation device, and
wherein the generation unit determines whether the data acquisition unit is executable by the second calculation device and generates the data acquisition unit by changing the model source to correspond to the first calculation device upon determining that the data acquisition unit is not executable by the second calculation device.

5. The application execution apparatus according to claim 4,
wherein the second calculation device is provided with an operating system, and
wherein the generation unit whether the second calculation device includes a plurality of cores upon determining that the data acquisition unit is executable by the second calculation device, and generates the data acquisition unit by changing the model source to correspond to a kernel of the operating system upon determining that the second calculation device does not include the plurality of cores.

6. The application execution apparatus according to claim 5, wherein the generation unit determines whether the data acquisition unit is provided with a dedicated core upon determining that the second calculation device includes the plurality of cores, and generates the data acquisition unit by changing the model source to correspond to the dedicated core upon determining that the dedicated core is provided.

7. An application execution method for executing an application including a data acquisition unit that acquires data transmitted from an IO device and a data utilization unit that utilizes the data acquired by the data acquisition unit, the application execution method comprising:
a first step, executed by a first calculation device, of implementing the data acquisition unit in a first space in which the application is able to be started after an occurrence of an event for starting the application within a time required for the application;

a second step, executed by a data linkage unit, of linking the data acquired by the data acquisition unit to the data utilization unit;

a third step, executed by a second calculation device, of implementing the data utilization unit in a second space different from the first space; and a fourth step, executed by a generation unit, of generating from a model source including a first description indicating a function of designating interface processing with the data utilization unit, a second description indicating a function of designating interface processing with the IO device, and a third description indicating data acquisition processing, a combined source in which the first description and the second description are converted into a description corresponding to the first calculation device, and compiles the combined source generated to generate the data acquisition unit.

8. An application execution method for executing an application including a data acquisition unit that acquires data transmitted from an IO device and a data utilization unit that utilizes the data acquired by the data acquisition unit, the application execution method comprising:

a first step, executed by a first calculation device, of implementing the data acquisition unit in a first space in which the application is able to be started after an occurrence of an event for starting the application within a time required for the application;

a second step, executed by a data linkage unit, of linking the data acquired by the data acquisition unit to the data utilization unit; and a third step, executed by a second calculation device, of implementing the data utilization unit in a second space different from the first space; and a fourth step, executed by a generation unit, that generates from a model source including a first description indicating a function of designating interface processing with the data utilization unit, a second description indicating a function of designating interface processing with the IO device, a third description indicating data acquisition processing, and a fourth description designating a calculation device that executes the data acquisition unit, a combined source in which the first description and the second description are converted into a description corresponding to the calculation device designated by the fourth description, and compiles the combined source generated to generate the data acquisition unit.

9. An application execution method for executing an application including a data acquisition unit that acquires data transmitted from an IO device and a data utilization unit that utilizes the data acquired by the data acquisition unit, the application execution method comprising:

a first step, executed by a first calculation device, of implementing the data acquisition unit in a first space in which the application is able to be started after an occurrence of an event for starting the application within a time required for the application;

a second step, executed by a data linkage unit, of linking the data acquired by the data acquisition unit to the data utilization unit; and a third step, executed by a second calculation device, of implementing the data utilization unit in a second space different from the first space; and a fourth step, executed by a generation unit, of generating the data acquisition unit from a model source, wherein the second calculation device is a calculation device different from the first calculation device, and wherein the generation unit determines whether the data acquisition unit is executable by the second calculation device and generates the data acquisition unit by changing the model source to correspond to the first calculation device upon determining that the data acquisition unit is not executable by the second calculation device.

* * * * *